J. H. RICHARDS & B. BELLINGHAM.
VALVE MECHANISM FOR INTERNAL COMBUSTION ENGINES.
APPLICATION FILED OCT. 8, 1910.

993,875.

Patented May 30, 1911.

WITNESSES

INVENTORS
John H. Richards.
Benjamin Bellingham.
By

J. H. RICHARDS & B. BELLINGHAM.
VALVE MECHANISM FOR INTERNAL COMBUSTION ENGINES.
APPLICATION FILED OCT. 8, 1910.

993,875.

Patented May 30, 1911.

7 SHEETS—SHEET 3.

WITNESSES.

INVENTORS John H. Richards
Benjamin Bellingham
By James T. Norris

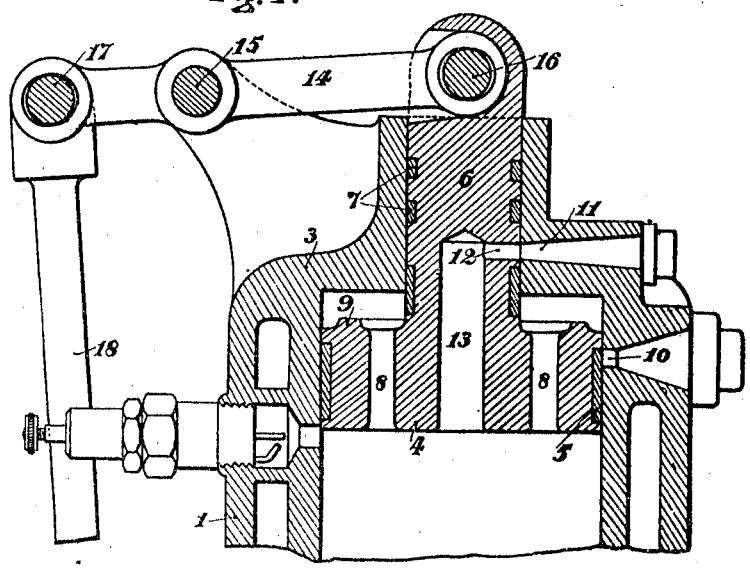

J. H. RICHARDS & B. BELLINGHAM.
VALVE MECHANISM FOR INTERNAL COMBUSTION ENGINES.
APPLICATION FILED OCT. 8, 1910.
993,875.
Patented May 30, 1911.
7 SHEETS—SHEET 5.
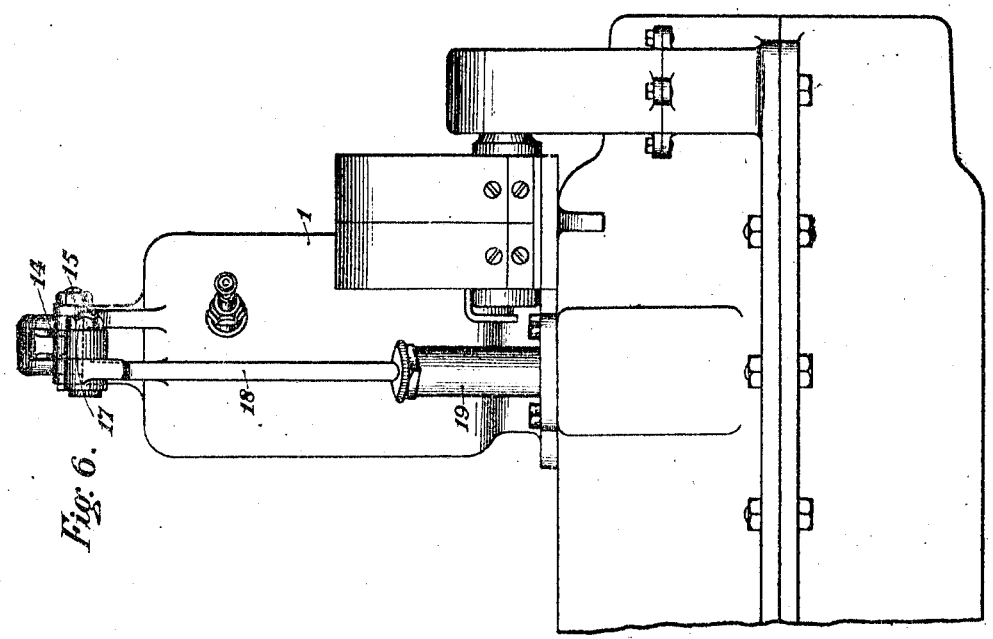
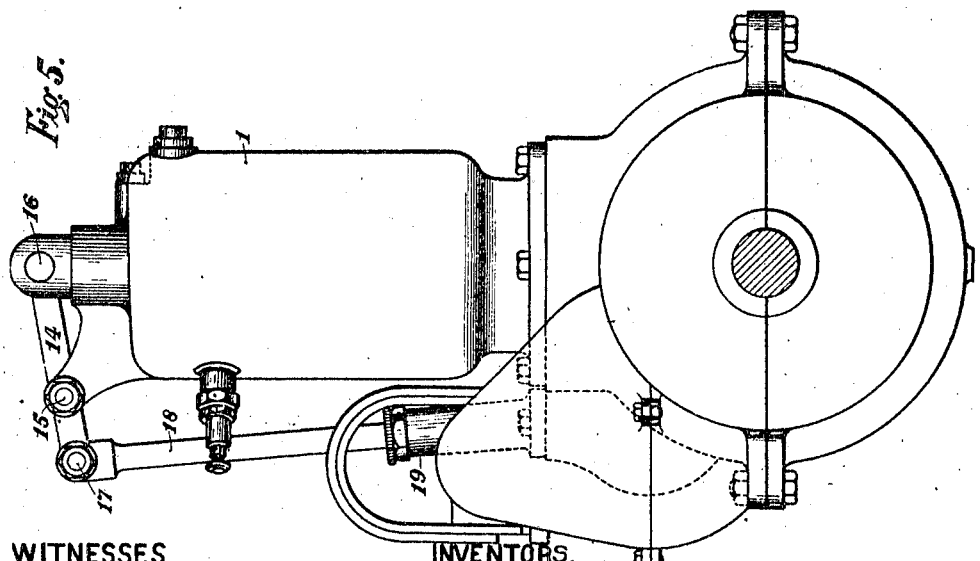
WITNESSES
INVENTORS.
John H. Richards.
Benjamin Bellingham.

J. H. RICHARDS & B. BELLINGHAM.
VALVE MECHANISM FOR INTERNAL COMBUSTION ENGINES.
APPLICATION FILED OCT. 8, 1910.
993,875.
Patented May 30, 1911.
7 SHEETS—SHEET 6.
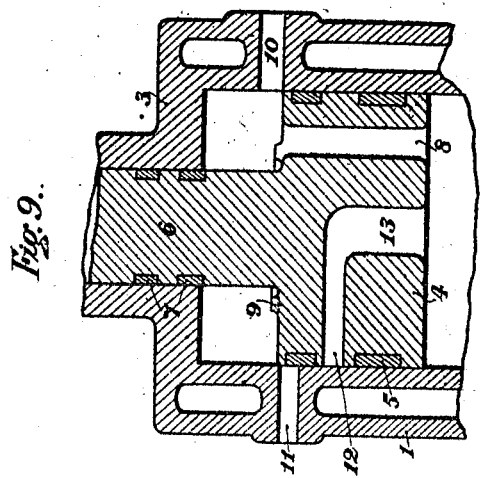
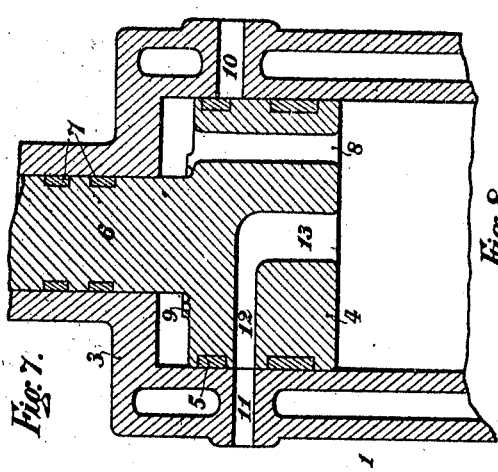
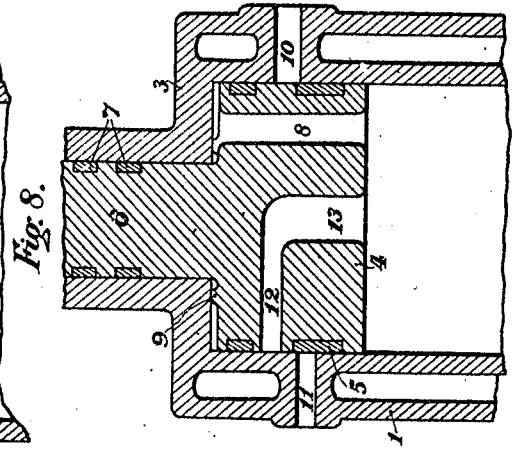
WITNESSES
INVENTORS.
John H. Richards.
Benjamin Bellingham

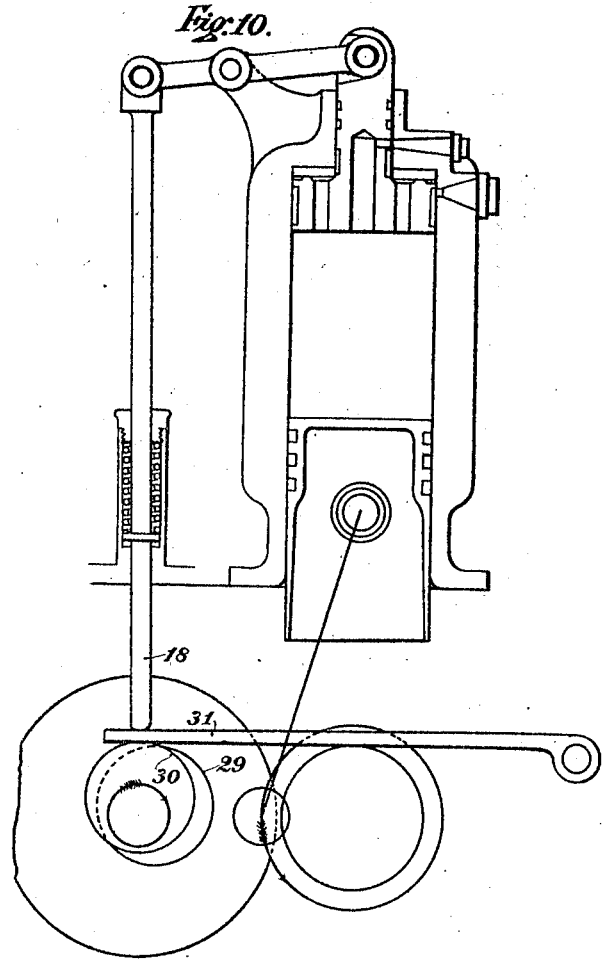

UNITED STATES PATENT OFFICE.

JOHN HARTLAND RICHARDS, OF TAMWORTH, AND BENJAMIN BELLINGHAM, OF SMETHWICK, NEAR BIRMINGHAM, ENGLAND.

VALVE MECHANISM FOR INTERNAL-COMBUSTION ENGINES.

993,875. Specification of Letters Patent. Patented May 30, 1911.

Application filed October 8, 1910. Serial No. 586,040.

*To all whom it may concern:*

Be it known that we, JOHN HARTLAND RICHARDS and BENJAMIN BELLINGHAM, subjects of the King of Great Britain, residing at Perry Crofts, Tamworth, county of Stafford, England, and Bearwood Road, Smethwick, near Birmingham, England, respectively, have invented certain new and useful Improvements in Valve Mechanism for Internal-Combustion Engines, of which the following is a specification.

This invention relates to valve mechanism for controlling the inlet and exhaust gases of internal combustion engines, principally of the four-stroke cycle type, said mechanism being of that type in which a sliding member is adapted to work within the main engine cylinder and to coöperate with inlet and exhaust ports in the latter.

The principal object of the present invention is to provide an improved and more efficient construction and arrangement of such valve mechanism which comprises a piston valve working in the engine cylinder, and arranged so that the pressures per unit area upon both sides are balanced, thereby relieving the valve actuating mechanism of undue strains.

Figure 1:
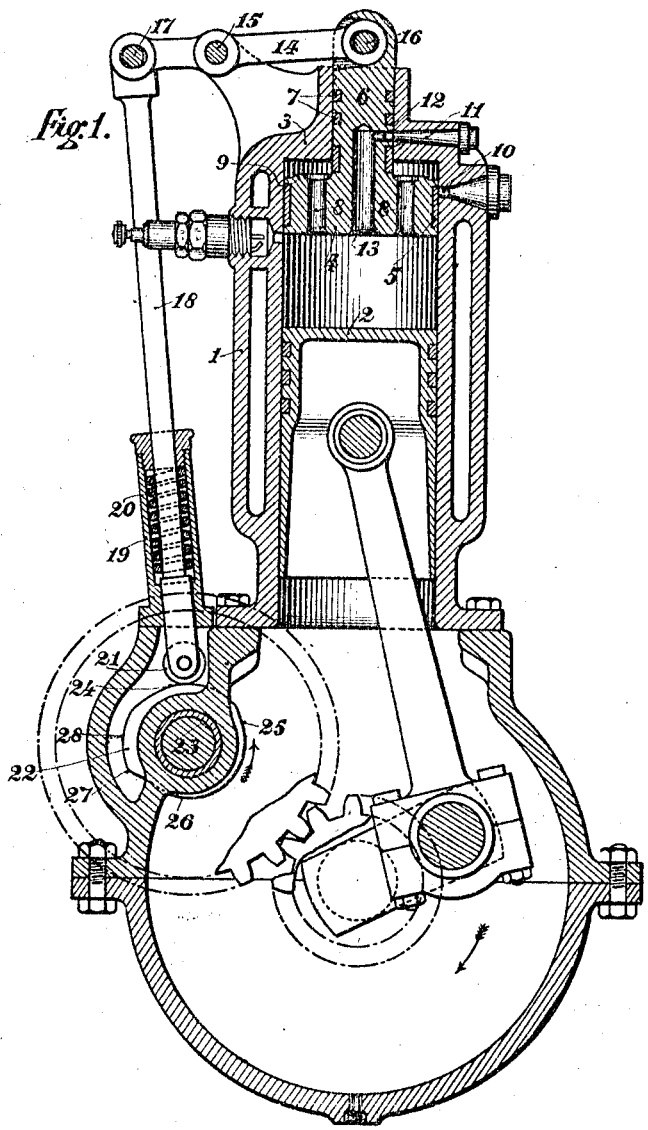
Figure 2:
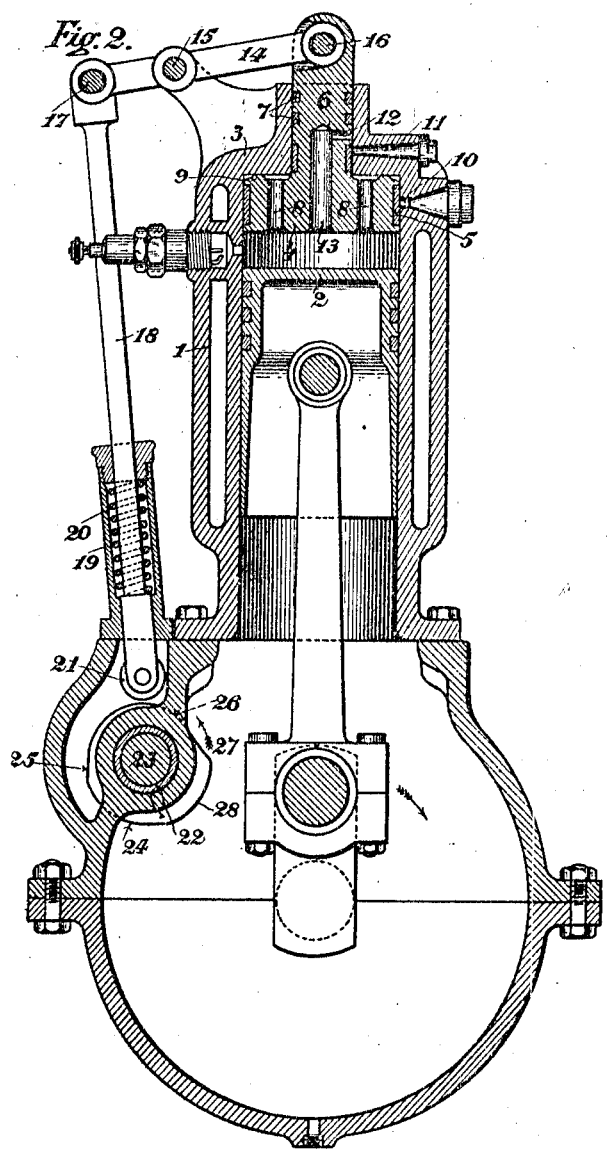
Figure 3:
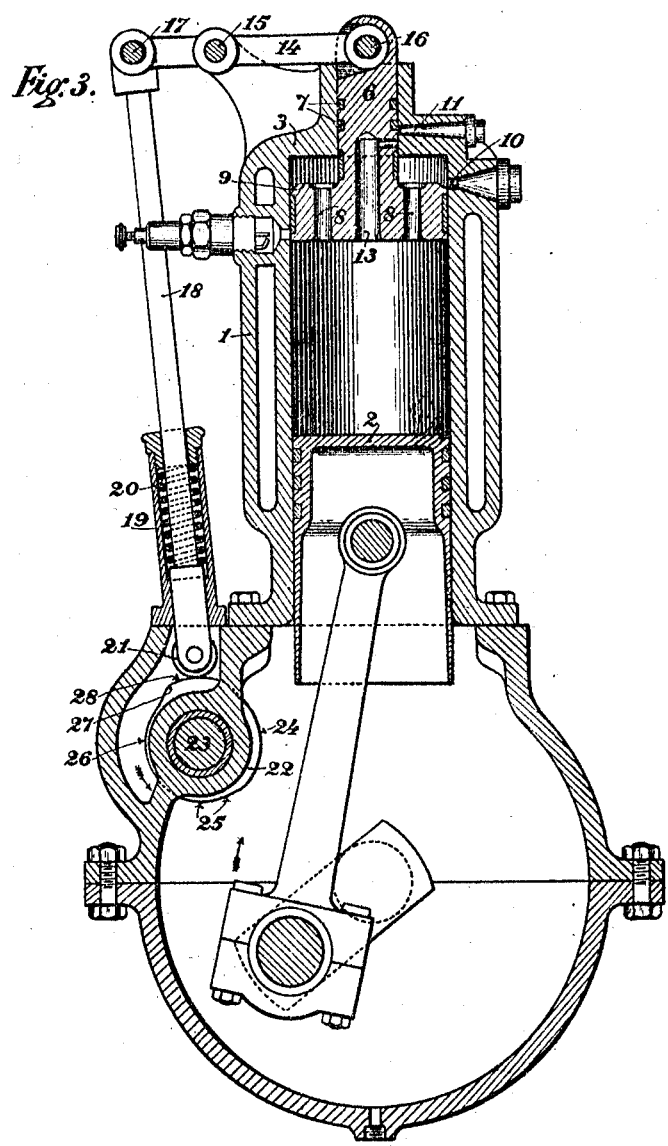

Figure 1 of the accompanying drawings is a vertical section showing the improved valve mechanism as applied to a four-stroke cycle engine, the parts being illustrated in their positions during the suction stroke. Fig. 2 is a similar view to Fig. 1, but with the valve in its position at the commencement of the explosion stroke. Fig. 3 shows said valve in position during the exhaust stroke. Fig. 4 represents an enlarged section through the upper portion of the engine with the valve in the position shown in Fig. 1. Fig. 5 is a side elevation of the engine showing the external portion of the valve operating mechanism. Fig. 6 is an end elevation of the engine. Fig. 7 illustrates a modified form of valve, same being shown in position during the suction stroke. Figs. 8 and 9 represent said valve in its position during explosion and exhaust strokes respectively. Fig. 10 shows diagrammatically a method of actuating the valve by a pair of eccentrics, instead of by a cam.

Referring to Figs. 1 to 6, the upper end of the main engine cylinder 1 extends a certain distance above the piston 2 (when in its highest position) so as to afford a cylindrical space or valve chamber between said piston and the inside of the cylinder head or crown 3. Within this chamber a piston valve 4 is arranged to move up and down in order to control the inlet and exhaust gases as hereinafter described. This piston valve, which is fitted with a suitable ring 5 engaging with the walls of the cylinder, is provided, upon its upper side, with a central cylindrical stem or trunk extension 6 which passes through, and is arranged to slide within the said cylinder head 3, as shown, the upper end of said shank or extension projecting above the head and being connected up with the actuating mechanism. The exterior of the stem or trunk 6 is fitted with expansion rings 7 so as to maintain a gas-tight joint. Passing through the piston valve 4 from the under to the top side are a number of passages 8 while upon the upper face are segments of an annular rib or collar 9, or other suitable projecting part, which when the valve is fully lifted, comes against the underside of the cylinder head (as seen in Fig. 2). By this arrangement there is always a space upon the upper side of the valve which is in communication with the underside, so that the gases act with equal pressure per unit area upon both sides, thus relieving the actuating mechanism of undue stresses.

Near the upper end of the cylinder, leading into the valve space or chamber, is an exhaust port 10 for the exit of the exhaust gases, while an admission or inlet port 11 for the entry of the explosive mixture is provided in the upper part of the cylinder head 3, the inner end leading into the central hole or bore in the latter within which the valve stem 6 works. Arranged to coöperate with the inlet port 11 is a lateral port 12 formed in the side of said valve stem 6, and which leads into a central chamber or passage 13 passing axially through the stem and piston 4, the lower open end communicating with the clearance space between the valve and engine piston 2, while the upper end is closed.

The valve is arranged to be actuated by means of a horizontally arranged overhead rock lever 14, fulcrumed at 15 to a lug or other suitable part on the cylinder head, and having its inner end jointed at 16 by a pin and slot connection (or equivalent arrangement) to the upper projecting end of the valve stem 6. The outer end of the lever 14 is similarly jointed at 17 to a downwardly extending rod 18 arranged to slide up and down within a guide sleeve 19. This rod 18, which is pressed downward by a spring 20 contained within the sleeve or casing 19, carries at its lower end a roller 21 which is engaged by a cam 22, of the shape shown, which is mounted upon the half-speed shaft 23 of the engine.

The action of the mechanism is as follows:—Assuming the suction stroke about to commence, the engine piston 2 will be at the top of its stroke, and the upper face of the valve 4, (see Fig. 1) will be a short distance below the closed inner end or crown of the cylinder, such that the port 12 in the valve stem 6 will be opposite to the inlet port 11. In this position the exhaust port 10 will be closed by being overlapped by the side walls of the piston valve 4. As the piston 2 descends, the valve, owing to the formation of the cam 22, remains stationary until said piston has nearly reached the end of its stroke, during which time the explosive mixture is drawn in through the admission port into the central chamber or passage 13 in the valve, and thence into the interior of the cylinder. During this time a plain concentric rest portion or dwell 24 of the cam has been moving under the roller 4 of the sliding actuating rod 18, but as the piston nears the lower end of its stroke, a slightly dropped portion 25 of the cam comes under the roller, causing the valve 4 to rise, and the port 12 in the valve stem moves above the inlet port 11 so as to cut off the admission. The valve 4 continues to slowly rise during the whole or portion of the compression stroke until the segments of the annular flange 9 upon its upper face abut against the crown or inside face of the cylinder head, as seen in Fig. 2. The roller 21 is now clear of another concentric rest or dwell portion 26 of the cam, so that the valve 4 remains stationary in its raised position, with both inlet and exhaust ports closed until the piston 2 has nearly reached the end of its firing stroke, when a lift or raised part 27 of the cam engages with the roller 21 and raises the actuating rod, thereby rapidly lowering the valve until, by the time the piston commences its upward stroke (see Fig. 3) the upper edge of the valve has uncovered the exhaust port 10 in the cylinder walls. To prevent any of the exhaust gases passing through the inlet port 11 as the port 12 in the valve stem 6 passes over the latter when the valve is descending, said inlet port may be fitted with a spring-loaded or other check valve (not shown) which will only open during the suction stroke. After the exhaust port 10 has been opened as above described, the valve 4 is again kept stationary by a dwell rest portion 28 of the cam engaging with the roller 21, and as the piston 2 ascends, it forces the exhaust gases through the passages 8 in the valve piston 4, into the space upon the upper side of same, and thence through the uncovered exhaust port 10. As the piston nears its highest point the valve 4 rises, and by the time the exhaust stroke is completed, the port 10 is fully closed, the cycle of operations being repeated as above described.

The through passages 8 in the valve piston 4 may be somewhat restricted in size, so that as the said piston rises the gases upon the upper side act as a cushion and prevent undue shocks.

Instead of actuating the valve by means of a cam as above described, the necessary movements may be obtained, as shown in Fig. 10, by two eccentrics 29, 30, set at an angle with one another, and both engaging with a tappet lever 31 (which is sufficiently broad for this purpose) the movement of which is transmitted to the connecting rod 18 and thence to the valve. The eccentric 29 is of greater diameter than the eccentric 30, and is used for placing the cylinder in communication with the exhaust port, and with the inlet port. The second eccentric 30 comes into use for the purpose of holding the valve open, during the suction stroke, for the desired period, and also for closing same and bringing the valve to a state of rest during a part of the compression and power strokes. By the eccentrics moving under the lever as above described a dwell or rest period is given to the valve at the desired points, due to the point of contact between said eccentrics and the lever gradually approaching the fulcrum of the latter, combined with the transfer of the motion from one eccentric to the other.

In the modification illustrated in Figs. 7 to 9, the inlet port 11 is formed in the side walls of the cylinder 1, while the body of the valve piston 4 is provided with the lateral port or passage 12 adapted to coöperate with said port 11. The valve is actuated by the trunk or stem 6 working through the head 3 of the cylinder, in the same manner as in the previously described form. During the suction stroke the valve is in the position shown in Fig. 7, the working fluid enters through the port 11, and passes through the valve port 12 and axial passage 13 into the interior of the cylinder. During the firing stroke both the inlet port 11 and exhaust port 10 remain closed, as shown in Fig. 8, while during the exhaust stroke the upper edge of the valve uncovers the said exhaust port 10 (see Fig. 9) so that the gases leave the cylinder through the passage 8 and out through the uncovered port. This arrangement necessitates piston rings 5, 5, being placed upon either side of the port 12, in order to prevent the fluid from entering the ports in the cylinder walls during the compression and firing strokes.

Having fully described our invention, what we desire to claim and secure by Letters Patent is:—

1. Valve mechanism for four-stroke cycle internal combustion engines, comprising a piston, working within the outer end of the main engine cylinder, and provided with independent inlet and exhaust passages between its inner and outer faces so as to maintain an equilibrium of pressure per unit area upon both its sides, said piston being adapted to coöperate in sequence with independent ports in the cylinder so as to control both the inlet and exhaust gases and being actuated so as to open and close the ports at the desired time, and to remain stationary at certain periods, substantially as herein described.

2. Valve mechanism for internal combustion engines, comprising a piston working within the outer end of the main engine cylinder, and adapted to coöperate with ports in said cylinder for the purpose of controlling the exhaust gases, said piston having a central stem which works within the cylinder head, and which is provided with a port communicating with the interior of the cylinder and adapted to coöperate with an inlet port in the cylinder head so as to control the admission of the working fluid, substantially as herein described and set forth.

3. Valve mechanism for four-stroke cycle internal combustion engines, comprising a piston working within the outer end of the main engine cylinder, and provided with passages between its inner and outer faces, said piston being adapted to coöperate with ports in the cylinder to control both the inlet and exhaust gases, and provided upon its outer end with a projecting part which, when the valve is fully lifted, comes against the crown of the cylinder head so as to always maintain a space upon the upper side of the piston which is in communication with the interior of the engine cylinder.

4. Valve mechanism for internal combustion engines, comprising a piston, working within the main engine cylinder, and provided with passages between the inner and outer faces, so as to maintain an equilibrium of pressure per unit area upon both its sides, said piston being adapted to coöperate with ports in the cylinder to control the admission, and its upper edge being arranged to uncover a port in the cylinder walls to provide for the escape of the exhaust gases, which pass through said passages to the upper side of the piston and thence through the exhaust port, substantially as herein described and set forth.

5. Valve mechanism for internal combustion engines comprising a piston valve working within an end of the engine cylinder and having ports between its inner and outer faces, the piston also having a lateral port and an axial chamber leading to its outer face from the lateral port, the cylinder having independent admission and exhaust ports, the former being arranged to communicate with the lateral port in one position of the piston valve and the latter being arranged to communicate with the space between the inner face of the piston and the adjacent inner face of the cylinder in another position of the piston valve, and valve operating means for causing the piston to assume its operative positions with relation to the strokes of the engine piston.

In testimony whereof we have hereunto set our hands in presence of two subscribing witnesses.

JOHN HARTLAND RICHARDS.
BENJAMIN BELLINGHAM.

Witnesses:
Hy. Skerrett,
Henry Norton Skerrett.